Patented Dec. 21, 1943

2,337,235

UNITED STATES PATENT OFFICE 2,337,235

PROCESSING OF TALL OIL

Eduard Färber, New Haven, Conn., assignor to Polyxor Chemical Co., Inc., New Haven, Conn., a corporation of New Jersey No Drawing. Application November 14, 1939, Serial No. 304,446

1 Claim. (Cl. 260—97.5)

My invention provides for the utilization of tall oil by a new method of distillation. In this way I can obtain valuable distillates from the tall oil, and these distillates can be further processed to render them useful in a wider field of applications.

Briefly, to obtain the distillates, I mix the tall oil with alkaline substances and then distill the mixtures. Generally speaking, the nature of the alkaline substance is immaterial. Preferably I use an inorganic oxide, hydroxide or salt such as a carbonate, of an earth alkali or an earth metal. In general, any basic oxide or hydroxide that is soluble in tall oil, either when heated or at room temperatures, will serve. Carbonates however, generally speaking, are subject to the fault that they tend to produce foaming. Mixtures of alkaline substances can be used.

The quantity of alkaline substances required is relatively low, and is considerably less than the amount necessary to neutralize all the acidic content of the tall oil. Based on an average neutralization equivalent of 300 for the tall oil, the amount of alkaline substance necessary is in most cases less than one third and in some cases as low as about one tenth of the quantity of alkaline materials necessary for complete neutralization. With the stronger alkaline substances, like sodium or potassium hydroxide for example, the necessary and favorable amount is in the lower part of the range; in the case of potassium hydroxide for instance, about one tenth of the neutralization equivalent is sufficient. With weaker alkaline substances, I use larger quantities; for example, with magnesium oxide I use about thirty percent (30%) of the calculated neutralization equivalent, or, say, for one hundred (100) kilograms of the tall oil I use about two (2) kilograms of magnesium oxide. In most cases, there is an upper limit beyond which distillation is not entirely feasible, at least by the simpler operations. For example, if one hundred (100) kilograms of tall oil are mixed with five (5) kilograms of calcium oxide the mass becomes so viscous on heating that it is quite difficult to distill off appreciable quantities of the material, whereas about the same quantity of calcium oxide as for magnesium oxide, namely about two percent (2%) by weight, gives a good yield. As pointed out above however, the proportions are not critical and operations within about the range indicated above are effective.

With a suitable quantity of one or more of the alkalines added to the tall oil, I distill the mixture. By fractional distillation, different distillates can be obtained. Frequently at least, the first distillate is aqueous in which a small quantity of an oily substance is entrained. The subsequent distillate can be divided into two notably different fractions, one fraction having relatively lower boiling points and being mostly acid or acidic in nature and the other fraction having higher boiling points and being mainly a neutral liquid and oily at ordinary temperatures. Usually the residue remaining after the distillation of the second fraction is a liquid at the temperature of distillation and is not decomposed at this temperature. On cooling, it solidifies to a brittle resinous material.

As a specific example, I mix one hundred (100) kilograms of crude tall oil with two (2) kilograms of magnesium oxide and distill this mixture at atmospheric pressure. As before suggested, the first distillate is some water in which a small percentage of an oily substance is entrained. The temperature of the distilling vapors quickly rises however to about 270° C., and from about this temperature to about 305° C. the distillate obtained is a faintly yellowish oily substance usually having a slight blue fluorescence, and having an acidic reaction. About 45 kilograms of this yellowish liquid is obtained usually within this temperature range. The distillate obtained at higher vapor temperatures, say from about 310° C. to about 330° C., is a somewhat more viscous and somewhat more deeply yellowish liquid, is oily in nature and substantially neutral. From 30 to 36 kilograms of this more viscous liquid is usually obtained between about these temperatures. Both these latter fractions have pleasant odors; they slowly darken in the presence of air and exposure to light. The lower or acidic fraction usually averages about 83% of carbon and the higher or neutral fraction usually averages about 88% of carbon. Usually the refractive indices rise from about $n^{20}_D=1.4900$ in the lower fraction to 1.521 in the higher boiling fraction. The residue is as before indicated.

It is to be understood of course that, for example, the temperatures given in the above example do not hold for all substances or for all relative proportions. For example, when using about one percent (1%), or a little more, of magnesium oxide with tall oil, and/or distilling very slowly, a distillate may be obtained up to as high as about 360° C. This higher fraction is more viscous than the fraction obtained up to 330° C., and its color is deeper, running from orange to red. It is to be understood too that my invention is not entirely limited to the separation of the total distillate into fractions, or into the fractions herein specifically mentioned.

The distillate, fractions of the distillate and the residue obtained by my operations have several useful applications. For example: The acidic fractions pointed to above can be transformed into salts, or by combining with alcoholic substances can form esters; both these salts and these esters can be used as plasticisers and solvents in the industry of plastics; they can be used also as sizing materials in the textile industries. The neutral fraction pointed to above can be treated with sulphuric acid, say of the usual commercial grade, to form a substance which has a strong emulsifying power. As an example of this, one hundred (100) kilograms of the neutral fraction of the distillate can be mixed with about thirty (30) kilograms of about 98% sulphuric acid. On standing, this mixture separates into two parts, one part or about 70 kilograms resembling a light oil and the other part or about 60 kilograms forming a heavy dark layer which contains the uncombined surplus of sulphuric acid. Both these parts of the distillate-fraction-sulphuric-acid-action can be freed of mineral acids by washing with water and the sulphurous acid present can be separated by air or by oxidizing agents at low temperatures as will be understood; both the light oily and the heavy dark portion, when thus treated, form quite stable emulsions between water and materials which ordinarily are substantially insoluble in water, and both are suitable for use as detergents, as wetting oils in the textile industry, etc. Also both these two products of the sulphuric acid processing of the neutral fraction of the distillate, especially when freed of their mineral acids, are especially suitable for use as emulsifiers for asphalt in water, an alkaline substance being added as will be understood from the present practice with asphalt emulsifiers. The ultimate resinous-residue of the distillation can be used for various of the purposes for which synthetic resins are used.

It will be understood of course that my invention is not limited to the details mentioned above except as appears hereinafter in the claim.

I claim:

The method of processing, which consists in mixing tall oil with less than a sufficient quantity of inorganic alkaline substance to neutralize the acid content of the mixture and more than about one-tenth of the quantity necessary for the complete neutralization thereof, fractionally distilling the mixture to obtain, first an acidic distillate, and then a distillate neutral in character, and mixing said neutral distillate with substantially concentrated sulphuric acid.

EDUARD FÄRBER.